United States Patent
Kim

(10) Patent No.: US 9,723,530 B2
(45) Date of Patent: Aug. 1, 2017

(54) APPARATUS AND METHOD FOR PROVIDING VOICE CALL CONTINUITY USING DIFFERENT NETWORKS IN WIRELESS COMMUNICATION SYSTEM

(71) Applicant: Samsung Electronics Co., Ltd., Suwon-si, Gyeonggi-do (KR)

(72) Inventor: Hye-Jeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 14/590,412

(22) Filed: Jan. 6, 2015

(65) Prior Publication Data

US 2015/0124777 A1  May 7, 2015

Related U.S. Application Data

(63) Continuation of application No. 13/660,397, filed on Oct. 25, 2012, now Pat. No. 8,953,560.

(30) Foreign Application Priority Data

Oct. 25, 2011  (KR) .......................... 10-2011-0109491

(51) Int. Cl.
*H04W 36/18* (2009.01)
*H04W 76/02* (2009.01)
*H04L 29/06* (2006.01)
*H04W 76/06* (2009.01)

(52) U.S. Cl.
CPC ......... *H04W 36/18* (2013.01); *H04L 65/1046* (2013.01); *H04W 76/026* (2013.01); *H04W 76/064* (2013.01)

(58) Field of Classification Search
None
See application file for complete search history.

(56) References Cited

U.S. PATENT DOCUMENTS

| | | | |
|---|---|---|---|
| 4,024,359 A | 5/1977 | De Marco et al. | |
| 8,249,016 B1* | 8/2012 | Kalbag | H04W 36/0066 370/310.2 |
| 2005/0049000 A1 | 3/2005 | Sheynman et al. | |
| 2006/0045069 A1* | 3/2006 | Zehavi | H04L 12/5692 370/352 |
| 2006/0121894 A1 | 6/2006 | Ganesan | |
| 2006/0126565 A1 | 6/2006 | Shaheen | |
| 2007/0014281 A1* | 1/2007 | Kant | H04L 29/06027 370/352 |

(Continued)

FOREIGN PATENT DOCUMENTS

| | | |
|---|---|---|
| CN | 102118717 A | 7/2011 |
| KR | 10-2009-0039825 A | 4/2009 |
| WO | 2011/083371 A1 | 7/2011 |

*Primary Examiner* — Gary Mui
(74) *Attorney, Agent, or Firm* — Jefferson IP Law, LLP

(57) ABSTRACT

An apparatus and a method for providing call continuity in a wireless communication system are provided. The apparatus includes a first communication unit for setting a call with a counterpart terminal in a first network, a second communication unit for setting a call with the counterpart terminal in a second network while the call is set in the first network, and a control unit for terminating the call of the first network after the call setup is completed in the second network.

14 Claims, 7 Drawing Sheets

(56) References Cited

U.S. PATENT DOCUMENTS

| | | | |
|---|---|---|---|
| 2007/0248079 A1* | 10/2007 | Jayaram | H04W 36/06 370/352 |
| 2008/0026752 A1* | 1/2008 | Flore | H04W 36/0022 455/435.2 |
| 2008/0089325 A1* | 4/2008 | Sung | H04W 36/30 370/389 |
| 2009/0180440 A1 | 7/2009 | Sengupta et al. | |
| 2009/0296654 A1* | 12/2009 | Bennett | H04W 36/0022 370/331 |
| 2010/0220655 A1 | 9/2010 | Helbert et al. | |
| 2011/0170455 A1* | 7/2011 | Cai | H04L 12/1403 370/259 |
| 2011/0188451 A1 | 8/2011 | Song et al. | |
| 2011/0230192 A1 | 9/2011 | Tiwari | |
| 2013/0122907 A1 | 5/2013 | Mutikainen | |
| 2013/0196665 A1 | 8/2013 | Tiwari | |
| 2015/0065134 A1* | 3/2015 | Vandemoere | H04W 36/0022 455/436 |

* cited by examiner

APPARATUS AND METHOD FOR PROVIDING VOICE CALL CONTINUITY USING DIFFERENT NETWORKS IN WIRELESS COMMUNICATION SYSTEM

PRIORITY

This is a continuation application of prior application Ser. No. 13/660,397, filed on Oct. 25, 2012, which claims the benefit under 35 U.S.C. §119(a) of a Korean patent application filed on Oct. 25, 2011 in the Korean Intellectual Property Office and assigned Serial No. 10-2011-0109491, the entire disclosure of which is hereby incorporated by reference.

BACKGROUND OF THE INVENTION

1. Field of the Invention

The present invention relates to a wireless communication system.

2. Description of the Related Art

As a demand for broadband communication service increases, changeover to a new standard communication technique for supporting high speed and large amounts of data is under consideration. When the new standard communication technique is introduced, the new system is subject to the limited coverage area during a transition period until a national network is built. Hence, when using a service, such as Voice over Internet Protocol (VoIP) in the new system, a user who is on the move can suffer from service interruption because of the limited coverage area.

To address this problem, the standard defines Voice Call Continuity (VCC) and Single Radio VCC (SRVCC) between the new network and the established network having the relatively wide coverage area. The established network considered in the VCC technology and the SRVCC technology indicates a Circuit Switched (CS) network, and the new network indicates a Packet Switched (PS) network. The VCC switches a voice call between a CS domain and an IP Multimedia Subsystem (IMS), and provides functions for voice call origination and voice call termination, and a function for the domain switches between the CS domain and the IMS. The SRVCC is the VCC between the PS access based IMS and the CS connection for the call anchored in the IMS when a terminal can transmit and receive over only one access network during a given time.

According to the VCC technology and the SRVCC technology, an IMS server functions as an anchor of every call. For example, not only the VoIP call over the new network but also the CS call are serviced based on the IMS, rather than the existing Public Switched Telephone Network (PSTN). The VCC allows bidirectional switching between the VoIP call and the CS call. However, for the bidirectional switching, the CS call should always use the IMS server without using the PSTN network. Accordingly, the air interface uses the CS network, and the core network uses the PS-based IMS server. Because of the difference of the communication manners, network efficiency can deteriorate and the performance of the voice service can be degraded. In addition, since voice handover is carried out in the IMS stage, not in the air interface, voice data can be lost thereby degrading voice quality by causing temporary voice interruption.

While the SRVCC can selectively use the CS call via the PSTN network and the call via the IMS server with a Mobile Switching Center (MSC), it supports only the unidirectional switching from the VoIP call to the CS call. For example, when the terminal leaves the coverage area of the new network during the call setup within the new network coverage area, the call is switched to the established network. However, the call is not switched to the VoIP call even when the terminal re-enters the new network coverage area. In this case, the CS call is anchored in the IMS server.

Furthermore, a new interface between the MSC, which controls the call in the CS network, and the IMS server, which controls the call in the PS network, needs to be configured. The SRVCC technology, which is based on the handover between heterogeneous networks, further needs interfaces between the two networks for the handover. For example, interfaces, such as 1×Circuit Switched (1×CS) InterWorking Solution function (IWS) and S102, are needed between a Code Division Multiple Access (CDMA)1×network and a Long Term Evolution (LTE) network, and interfaces, such as S3 and S3-CS, are needed between a Wideband CDMA (WCDMA) network and the LTE network.

Another problem of the related art is that, when the PS network and the CS network adopt different vocoders, transcoding in the core network needs to be performed, or one network needs to be modified in order to use the same vocoder in both networks. For example, the LTE network and the CDMA1×network adopt different vocoders of Adaptive Multi Rate (AMR) audio codec and Enhanced Variable Rate Codec (EVRC). The VCC should perform the transcoding until the voice call terminates after the VCC of the IMS server, or the vocoders of the two networks should be identical. The former increases load of the core network, and the latter needs to extend the vocoder supported by the terminal. The core network of a provider basically supports the transcoding in the communication with a subscriber of other provider. However, since the VCC needs the transcoding even in the communication between the subscribers of the same provider, the load of the core network greatly increases. Similar to the VCC, the SRVCC needs the transcoding in the core network or the identical vocoder. Yet, the SRVCC can allow the existing voice call over the PSTN. When the vocoder is standardized to the AMR, the CS network should support both of the AMR and the EVRC.

As discussed above, the call service provision merely with the new system cannot ensure the call continuity during the transition period until the new system establishes the nationwide network. Thus, the VCC or SRVCC technology over the established network needs to be used as aforementioned. However, the current standard VCC technology and SRVCC technology need additional interfaces in the new network and the established network. In addition, the handover can cause connection delay. Furthermore, data can be lost and the identical vocoder is problematic. Hence, what is needed is a solution for addressing the problems, such as additional interface construction, connection delay, data loss, and identical vocoder.

Therefore, a need exists for an apparatus and a method for providing voice call continuity using different networks in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for providing call continuity in a wireless communication system.

Another aspect of the present invention is to provide an apparatus and a method for providing call continuity between different systems without additional new interface in a wireless communication system.

Yet another aspect of the present invention is to provide an apparatus and a method for providing continuity between a Voice over Internet Protocol (VoIP) call and a Circuit Switched (CS) call in a wireless communication system.

In accordance with an aspect of the present invention, an apparatus of a terminal in a wireless communication system is provided. The apparatus includes a first communication unit for setting a call with a counterpart terminal in a first network, a second communication unit for setting a call with the counterpart terminal in a second network while the call is set in the first network, and a control unit for terminating the call of the first network after the call setup is completed in the second network.

In accordance with another aspect of the present invention, an apparatus for controlling a call in a wireless communication system is provided. The apparatus includes a communication unit for receiving a call setup request of a first network, and a control unit for, when at least one of an originator and a recipient of a call of the first network holds a call in a second network, determining whether the call of the first network is a dual call requested between terminals which set the call in the second network, and for allowing the call setup of the first network when the call of the first network is the dual call.

In accordance with another aspect of the present invention, an operating method of a terminal in a wireless communication system is provided. The method includes setting a call with a counterpart terminal in a first network, setting a call with the counterpart terminal in a second network while the call is set in the first network, and terminating the call of the first network after the call setup is completed in the second network.

In accordance with another aspect of the present invention, an operating method of an entity for controlling a call in a wireless communication system is provided. The method includes receiving a call setup request of a first network, when at least one of an originator and a recipient of a call of the first network holds a call in a second network, determining whether the call of the first network is a dual call requested between terminals which set the call in the second network, and when the call of the first network is the dual call, allowing the call setup of the first network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
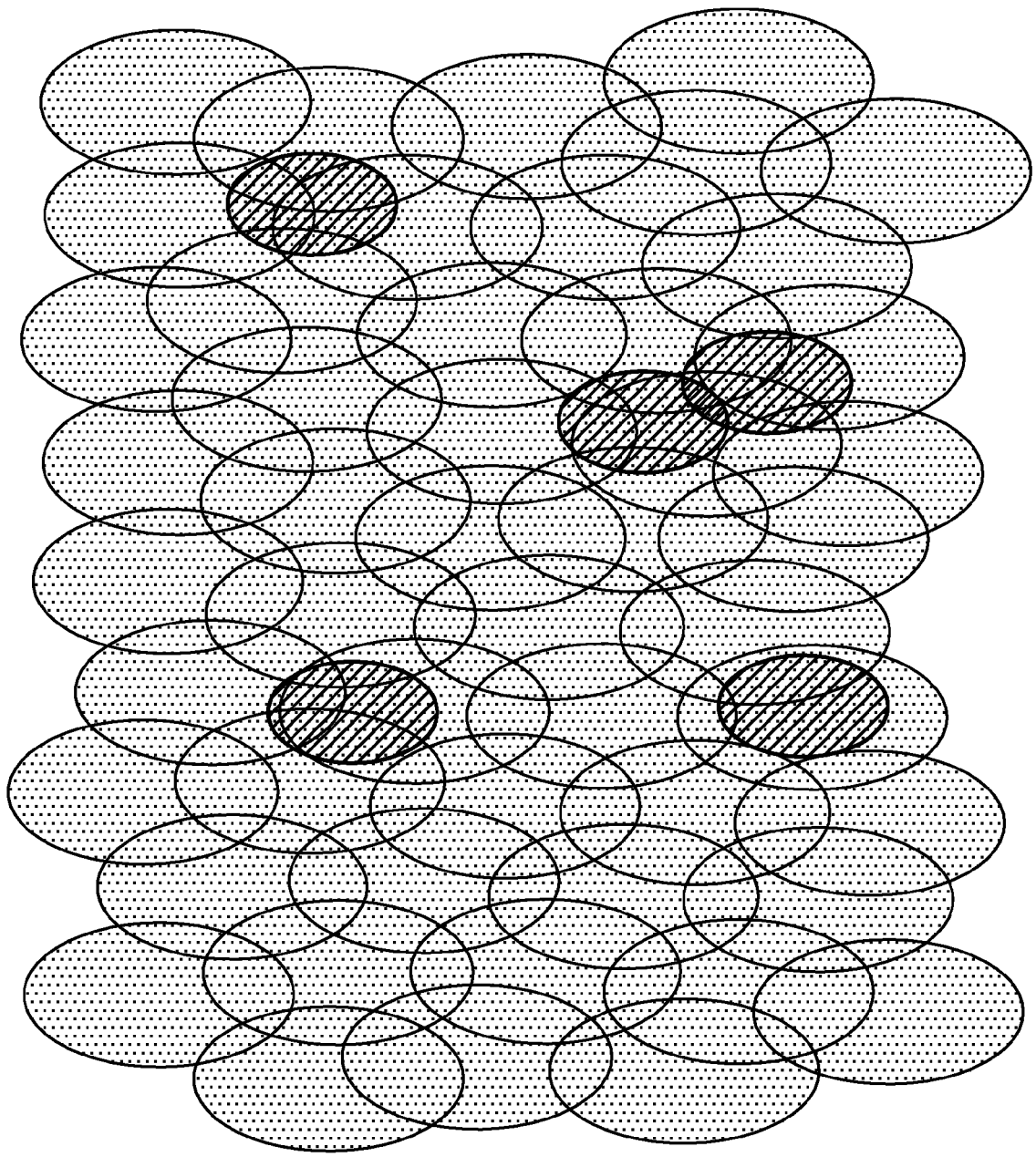
FIG. 1 illustrates coverage area distribution of a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to an apparatus and a method for providing voice call continuity using different networks in a wireless communication system. Exemplary embodiments of the present invention provide a technique for providing call continuity using different networks in a wireless communication system. Hereinafter, it is assumed that a first network and a second network conform to different standards. The first network offers dense coverage area within a certain area, and the second network offers coverage area occupying part of the coverage area of the first network.

FIGS. 1 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates coverage area distribution of a wireless communication system according to an exemplary embodiment of the present invention.

Referring to FIG. 1, the first network controls a coverage area that includes the whole area. The second region controls the relatively limited coverage area, and the coverage area of the second network overlaps with part of the coverage area of the first network. The coverage area distribution, as in the second network, can exhibit during a transition period for establishing the second network all over the nation. In this case, the first network can be the established nationwide network.

The first network and the second network conform to different communication standards. For example, the first network can be a Circuit Switched (CS) network based on a Public Switched Telephone Network (PSTN), and the second network can be a Packet Switched (PS) network based on the Internet. For example, the CS network can adopt Code Division Multiple Access (CDMA)1x, Global System for Mobile Communications (GSM), and Wideband CDMA (WCDMA). The PS network can adopt 3rd Generation Partnership Project Long Term Evolution (3GPP LTE), Worldwide Interoperability for Microwave Access (Wi-MAX), and Wireless Fidelity (WiFi). It is assumed that the first network is the CS network and the second network is the PS network. Notably, exemplary embodiments of the present invention are equally applicable to PS networks of other standards.

Figure 2:
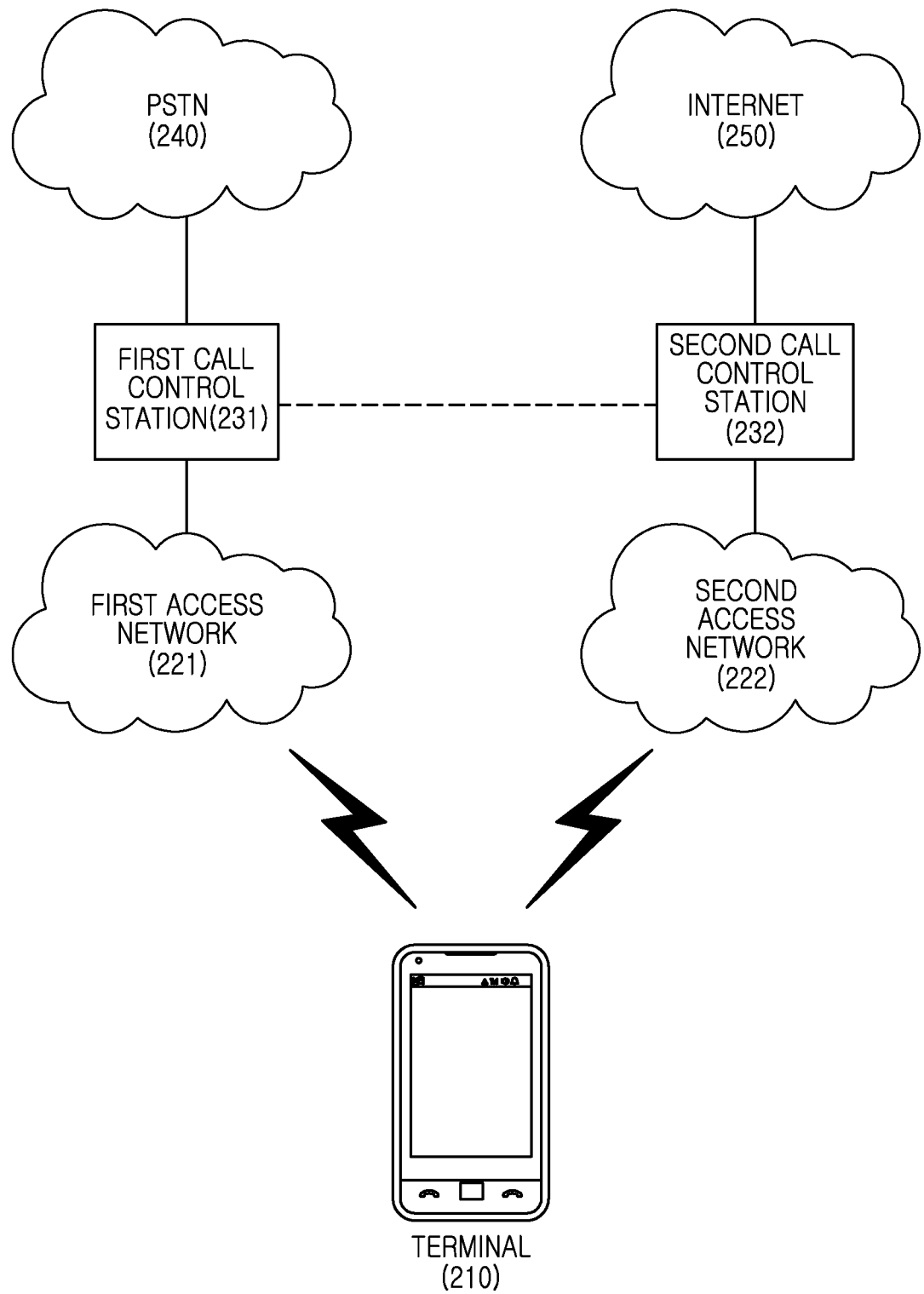
FIG. 2 illustrates a simplified hierarchical structure of a wireless communication system according to an exemplary embodiment of the present invention.

FIG. 2 illustrates a simplified hierarchical structure of a wireless communication system according to an exemplary embodiment of the present invention.

Referring to FIG. 2, the system includes a terminal 210, a first access network 221, a second access network 222, a first call control station 231, a second call control station 232, a PSTN 240, and Internet 250.

The terminal 210 can access the first access network 221 of the first network and the second access network 222 of the second network. In other words, the terminal 210 includes an interface for accessing the first network and an interface for accessing the second network. For example, the terminal 210 includes two or more modems which can be implemented using separate chips or using a single chip. The terminal 210 supports Simultaneous Voice and Data (SVD). The SVD is a function for supporting voice communication and data communication at the same time. More particularly, the terminal 210 supports dual call based network switch using the two or more modems. The terminal 210 may be implemented using one of a cellular phone, a Personal Communication System (PCS), a Personal Digital Assistant (PDA), a smart phone, and a tablet Personal Computer (PC), etc., and can be referred to as a User Equipment (UE) or a Mobile Station (MS).

The first access network 221 belongs to the first network and provides radio access for the service over the first network. The configuration of the first access network 221 can differ according to the system standard of the first network and a provider's intention. For example, the first access network 221 can include a Base Transceiver Station (BTS) and a Base Station Controller (BSC). The BTS includes a radio transceiver and communicates with the terminal 210 over a radio link. The BSC, which is a higher node of the BTS, manages a plurality of BTSs and functions for radio channel setup and handover processing.

The second access network 222 belongs to the second network and provides radio access for the service over the second network. The configuration of the second access network 222 can differ according to the system standard of the second network and a provider's intention. For example, the second access network 222 can include an evolved Node B (eNB), a Serving GateWay (S-GW), a Packet data network GateWay (P-GW), and a Mobility Management Entity (MME). The eNB includes a radio transceiver and communicates with the terminal 210 over a radio link. The S-GW manages a data path between the eNB and the packet network. The P-GW allocates an Internet Protocol (IP) address to the terminal 210, applies Quality of Service (QoS) policy, and functions as a gateway for delivering data. The MME authenticates the terminal 210 and manages bearer and mobility.

The first call control station 231 controls a call originating from the terminal 210 over the first network and a call received at the terminal 210 over the first network. For example, the first call control station 231 identifies a counterpart of the call originating from the terminal 210 over the first network, and determines whether to allow the call. The first call control station 231 determines whether to allow the call received at the terminal 210, and pages the terminal 210 over the first access network 221. The first call control station 231 can be referred to as a Mobile Switching Center (MSC).

The second call control station 232 controls a call originating from the terminal 210 over the second network and a call received at the terminal 210 over the second network. Namely, the second call control station 232 identifies a counterpart of the call originating from the terminal 210 over the second network, and determines whether to allow the call. The second call control station 232 determines whether to allow the call received at the terminal 210, and pages the terminal 210 over the second access network 222. The second call control station 232 can be referred to as an IP Multimedia Subsystem (IMS) server or a Call Session Control Function (CSCF).

The PSTN 240 is the core network of the first network and enables subscribers to communicate with each other by accessing the telephone line. CS call signals can be transferred between subscribers of different providers over the PSTN 240. In contrast, CS call signals can be transferred between subscribers of the same provider via the first call control station 231, for example, via the MSC. The Internet 250 is the core network of the second network and is established to transmit and receive data according to Internet protocol. Voice packets for Voice over IP (VoIP) call are delivered between the subscribers of the different providers over the Internet 250. In contrast, voice packets for the VoIP call can be delivered between subscribers of the same provider via the second call control station 232, for example, the IMS server.

Features of an exemplary embodiment of the present invention are explained with reference to FIGS. 1 and 2. It is assumed that two terminals A and B are present and the VoIP call is set up between the terminal A and the terminal B over the second network. The terminal A and the terminal B continuously monitor whether to switch the network for the call continuity. The network switch indicates the change of the call connection medium from the second network to the first network. For example, a network switch condition can describe that a signal strength of the second network is smaller than a first threshold and the signal strength of the first network is smaller than a second threshold. When determining that the network switch condition is satisfied, the terminal A operates for the network switch. The present network switch differs from the Inter Radio Access Technology (IRAT) handover of the related art in that the terminal itself determines whether to switch the network and attempts the network switch when the network switch is needed. The present network switch can be referred to as Dual Call Voice Call Continuity (DCVCC).

Upon determining the network switch, the terminal A additionally sets the call over the first network while holding the call over the second network. For doing so, the terminal A accesses the first access network 221 and requests the first call control station 231 to set the call to the terminal B. In so doing, User Interface (UI) for the call connection, for example, recipient number display and connection sound output are omitted. Naturally, a user of the terminal A cannot recognize the network switch. Alternatively, to inform the user of the network switch, the terminal A can notify the network switch using a screen or a sound. Thereafter, when the call in the first network is set, the terminal A switches the voice data path from the modem for the second network to the modem for the first network and terminates the call in the second network.

The first call control station 231 receiving the call setup request determines whether to allow the call originating from the terminal A. For example, since the terminal A can set the call over not only the first network but also the second network, the first call control station 231 determines whether the terminal A holds the call in the second network. For doing so, the first call control station 231 can obtain information of call status of the terminal A from the second call control station 232, or from a separate entity which manages the call status of the terminals. For example, the separate entity can be referred to as a Home Subscriber Server (HSS). Since the terminal A holds the call in the second network, the dual call setup over the first network is not allowed in principle. However, in this exemplary embodiment of the present invention, the first call control station 231 compares the counterpart of the call set in the second network with the recipient of the call requested in the first network. When the counterparts of the two calls are identical according to the comparison result, the first call control station 231 recognizes the network switch and allows the call setup. Hence, the first call control station 231 pages the terminal B over the first access network 221. In so doing, when the terminal A and the terminal B are managed by different call control stations in the first network, the first call control station 231 requests the paging to the different call control station which manages the terminal B. The different call control station which manages the terminal B determines whether the terminal B holds the call in the second network, compares the counterpart of the call set in the second network with the originator of the call requested in the first network, recognizes the network switch when the counterparts of the two calls are identical, and pages the terminal B over the first access network 221. Alternatively, when the terminal A requests the call setup in the first network, an indicator notifying the DCVCC-based network switch can be transmitted together. The first call control station 231 can recognize the network switch based on the indicator without a separate confirmation procedure. In this case, the first access network 221 can also recognize the network switch.

The terminal B receiving the paging over the first network sets a traffic channel for the call of the first network. Upon receiving an Alert with Information Message (AWIM), the terminal B compares the originator of the call and the counterpart of the call set in the second network. When the counterparts of the two calls are identical according to the comparison, the terminal B recognizes the network switch and switches the call over the second network to the call over the first network. In so doing, the UI for the call connection, for example, the originator number display, reception sound output, and user acceptance standby are all omitted. For example, the terminal B switches the voice data path from the modem for the second network to the modem for the first network.

As such, the handover of the PS network and the CS network can be fulfilled without additional new interface for supporting the VCC. Furthermore, the air interface does not have to be modified.

In the network switch, the following method can be applied to minimize the voice interruption caused by the switching of the voice data path. Hereafter, the switching of the voice data path is referred to as voice switching.

For the voice communication, an audio codec samples voice input to a microphone to a digital signal and outputs the sampling data to the modem. Concurrently, the audio codec converts a voice signal received from the modem to an analog signal and outputs the analog signal to a speaker. Mostly, the voice data path between the audio codec and the modem is activated only for one modem. For example, the audio codec transmits and receives the voice data to and from one modem. Accordingly, when the network is switched according to the VCC, the voice data path of the audio codec is switched between the modems.

However, the present dual call based DCVCC can concurrently operate vocoders for the respective networks because two calls are dually set. For example, the audio codec of the transmitting terminal provides the voice data to both of the two modems, and the two modems encode the voice data using their vocoder and transmit the audio packets over the air interface. Two modems of the receiving terminal restore the same voice data by decoding the voice packets received over the corresponding network, and provide the voice data to the audio codec. In so doing, through the switching in front of the audio codec, only one of the voice data provided from the two modems is input to the audio codec, converted to the analog signal, and output through the speaker. For example, when the DCVCC is conducted from the LTE system to the CDMA system, the LTE modem and the CDMA modem simultaneously decode the voice data and only the voice data from the LTE modem is output to the audio codec. In so doing, when the VCC is determined, the voice switching forwards the voice data from the CDMA modem to the audio codec.

In conclusion, the transmitting terminal encodes the voice signal input through the microphone according to the schemes of the respective networks and transmits the voice packets to the respective networks. The receiving terminal decodes all of the voice packets received over the respective networks, and outputs only one voice data through the speaker. At the point of the VCC, the receiving terminal performs the voice switching. When the aforementioned method is applied, one or more voice packet loss does not occur even though the two networks are not accurately synchronized. Yet, when the audio codec does not allow multi-output using a plurality of interfaces, the audio codec can transmit and receive the voice data to and from the single modem.

Another method for minimizing the voice interruption delays the termination of the call of the previous network for a certain time after the voice switching. The voice switching points of the two terminals may be different. Hence, when one terminal switches the voice and terminates the call but the other terminal does not yet switch the voice, the voice data can be lost. For example, when the voice is switched from the PS network to the CS network, one terminal switches the voice and terminates the PS call, and the other terminal does not yet switch the voice to the CS network, the other terminal cannot output the voice until the voice switching to the CS network. Thus, when the two terminals hold the dual call setup during a certain time after the voice switching, the voice interruption can be prevented.

By virtue of the voice switching and the encoding/decoding, the transcoding between the different vocoders is not needed. When the PS network and the CS network employ different vocoders, the VCC of the related art needs the identical transcoding or vocoder. However, since an exemplary embodiment of the present invention is based on the setup of the two independent calls, the transcoding is not needed even with the different vocoders. In addition, as the audio codec performs the voice switching, the voice data loss is minimized. In terms of service quality, the minimized voice data loss ensures the minimized voice interruption period.

When the call connection medium is changed according to the DCVCC, various errors can take place. For example, the error can include failure of the call setup in the new network. In this case, a criterion for determining the failure and a measure should be defined. For example, the criterion for determining the failure can use a timer. Alternatively, the failure criterion of the call connection defined in the standard of the corresponding network can be adopted. As an example of the measure, the terminal can limit the number of retry attempts after the failure. Alternatively, as the measure, the terminal can operate as defined in the standard of the corresponding network.

Another example of the error can include a case where two terminals attempt the network switch. The first call control station receiving the call setup request determines whether the terminal requesting the call setup holds the call in the second network, determines whether the call is the dual call, and permits the call setup over the first network. However, when the receiving terminal requests the dual call to the first call control station at the same time, the first call control station determines that the call setup is infeasible even though the receiving terminal determines the call setup in the first network and permits the dual call. In this case, in response to the general call, a response is transmitted to the originator during the communication. For example, when two terminals attempt the network switch at the same time, both terminals receive the response indicating that the counterpart is on the telephone. As the measure, when the receiving terminal determines the call setup in the first network during the dual call try, the call control station of each system can disconnect the call. In this case, the terminal can retry the dual call connection. As another measure, when the terminal can recognize that the counterpart is on the telephone, the terminal can disconnect the call and retry the dual call setup according to a predefined rule. For example, when receiving a signal or information informing that the counterpart terminal is on the telephone, during the dual call setup, each terminal can recognize the concurrent dual call setup attempt and only one terminal selected from the two terminals according to the predefined rule can retry the dual call setup. For example, the predefined rule can include the retry of the terminal originating the existing call. In so doing, the response during the call can be replaced by a separate response indicating the concurrent attempt.

Yet another example of the error can include the drop of the first call during the second call setup. In this case, the terminals persist with the second call setup. When the second call setup also fails, that is, when both calls fail, the terminals determines the call drop. Thus, the call drop rate of the terminal can be lowered. The network switch according to the VCC is mostly performed in the boundary of the PS network coverage area. According to the VCC based on the handover, when the call in the established network is dropped before the network switch is completed, the handover is aborted and the call is dropped. However, the dual call based DCVCC, which has no interaction between two networks, can allow the call setup in the new network even when the call is dropped in the established network.

The terminals which set the call in the second network can change the call connection medium to the first network. Alternatively, the terminals which set the call in the first network can change the call connection medium to the second network in the similar manner. Yet, since the coverage area of the second network is relatively limited, the determination of whether the counterpart travels in the coverage area of the second network is imperative. The travel in the coverage area of the second network can be determined by an entity which manages the mobility in the second network. For example, the entity which manages the mobility can be the IMS server.

The VCC mostly takes place in the boundary of the network of the limited coverage area. Hence, when the terminal persists with the call in the boundary, the VCC can repeatedly arise between the first network and the second network. To avoid the repetitive VCC, the network switch, that is, the DCVCC from the second network of the limited coverage area to the first network, can be always allowed due to its high call drop rate. The network switch, that is, the DCVCC from the first network to the second network, can be allowed after a certain time from the previous DCVCC, or the criterion for determining the DCVCC can be reinforced. In addition, the DCVCC from the first network to the second network can be prohibited.

Now, structures and operations of the terminal and the call control station for providing the call continuity as stated above are discussed below.

Figure 3:
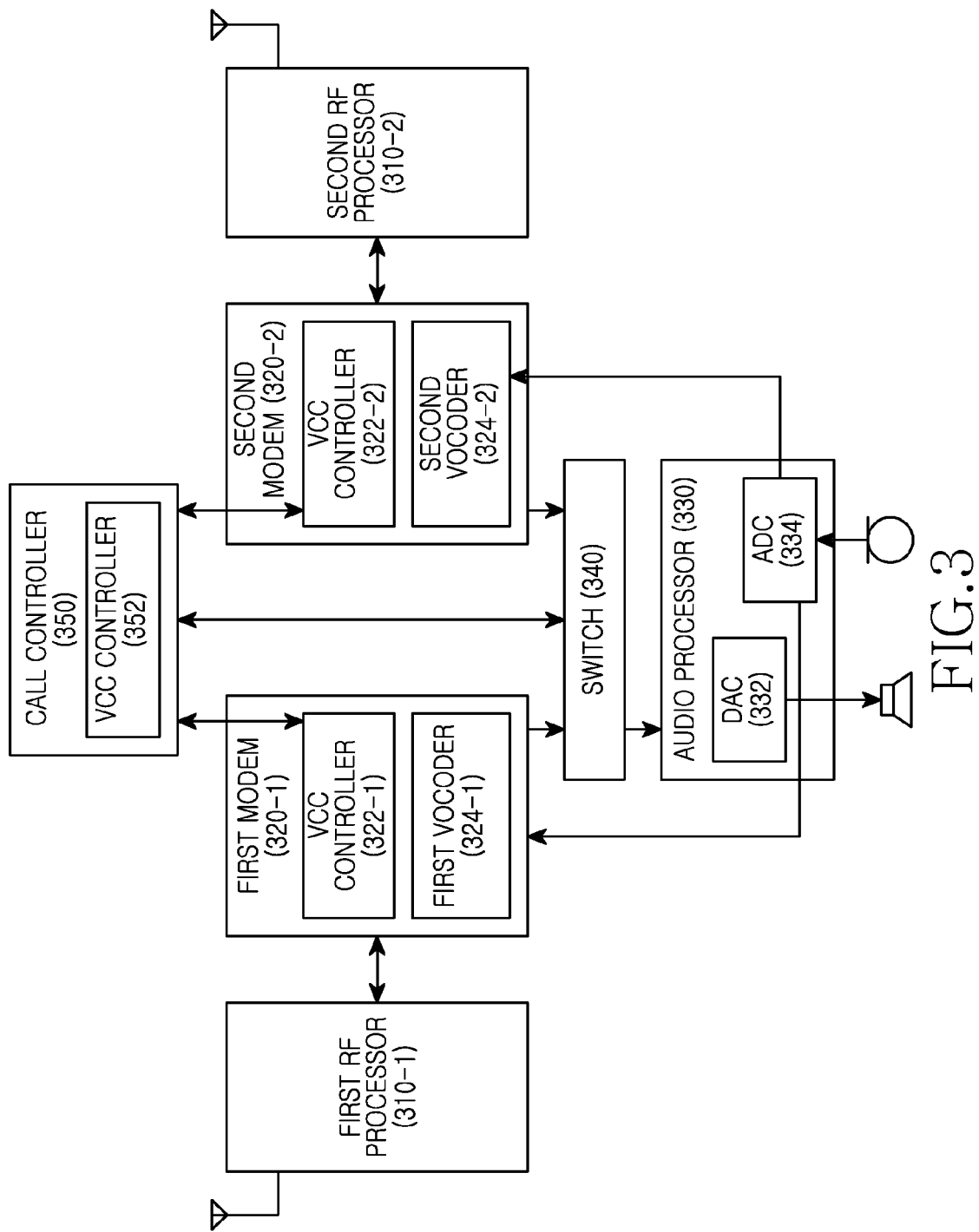
FIG. 3 is a block diagram of a terminal in a wireless communication system according to an exemplary embodiment of the present invention.

FIG. 3 is a block diagram of a terminal in a wireless communication system according to an exemplary embodiment of the present invention.

Referring to FIG. 3, the terminal includes a first Radio Frequency (RF) processor 310-1, a second RF processor 310-2, a first modem 320-1, a second modem 320-2, an audio processor 330, a switch 340, and a call controller 350.

The first RF processor 310-1 and the first modem 320-1 are the interface for accessing the first network, and the second RF processor 310-2 and the second modem 320-2 are the interface for accessing the second network. The first modem 320-1 and the second modem 320-2 can be implemented using two separate chips, or using the single united chip which supports multi-mode. When the first modem 320-1 and the second modem 320-2 are implemented using the single united chip, the united chip can include the switch 340. The modem can be referred to as a communication unit. Alternatively, the bundle of the modem and the RF processor can be referred to as the communication unit.

The first RF processor 310-1 converts an RF signal and a baseband signal of a frequency band used by the first network. The first RF processor 310-1 can include an amplifier, a mixer, an oscillator, a Digital to Analog Converter (DAC), and an Analog to Digital Converter (ADC). The second RF processor 310-2 converts an RF signal and a baseband signal of a frequency band used by the second network. The second RF processor 310-2 can include an amplifier, a mixer, an oscillator, a DAC, and an ADC.

The first modem 320-1 converts the baseband signal and a bit string according to a physical layer standard of the first network. For example, in conformity with the CDMA, the first modem 320-1 spreads the transmit signal using the code, and despreads the received signal. The first modem 320-1 periodically measures a channel quality of the first network and provides channel quality information to the call controller 350. Herein, the channel quality can be represented as a signal strength, a receive power, a Signal to Noise Ratio (SNR), a Signal to Interference and Noise Ratio (SINR), and a Carrier to Interference and Noise Ratio (CINR). The first modem 320-1 includes a VCC controller 322-1 for the network switch according to the VCC. In this exemplary embodiment of the present invention, when the call is ongoing in the first network, the VCC controller 322-1 monitors whether the network switch condition is satisfied, and triggers the call controller 350 to perform the network switch when the network switch condition is satisfied. Alternatively, the first modem 320-1 can provide the channel quality to the call controller 350, and the call controller 350 can determine whether the network switch condition is satisfied. The first modem 320-1 includes a first vocoder 324-1 for encoding the voice data output from the audio processor 330 and decoding the voice packet received over the first network.

The second modem 320-2 converts the baseband signal and the bit string according to a physical layer standard of the second network. For example, in conformity with Orthogonal Frequency-Division Multiplexing (OFDM), to transmit the data, the second modem 320-2 generates OFDM symbols by applying Inverse Fast Fourier Transform (IFFT) and inserting a Cyclic Prefix (CP), and restores signals mapped to subcarriers using FFT. The second modem 320-2 periodically measures a channel quality of the second network and provides channel quality information to the call controller 350. Herein, the channel quality can be represented as the signal strength, the receive power, the SNR, the SINR, and the CINR. The second modem 320-2 includes a VCC controller 322-2 for the network switch according to the VCC. In this exemplary embodiment of the present invention, when the call is ongoing in the second network, the VCC controller 322-2 monitors whether the network switch condition is satisfied, and triggers the call controller 350 to perform the network switch when the network switch condition is satisfied. Alternatively, the second modem 320-2 can provide the channel quality to the call controller 350, and the call controller 350 can determine whether the network switch condition is satisfied. The second modem 320-2 includes a second vocoder 324-2 for encoding the voice data output from the audio processor 330 and decoding the voice packet received over the second network.

The audio processor 330 processes the voice data transmitted and received by the call. For example, a DAC 332 of the audio processor 330 converts the received voice data to an electric signal of the sound, and outputs the electric signal to the microphone. An ADC 334 of the audio processor 330 converts the electric signal of the sound input through the microphone to the voice data. The audio processor 330 has paths connected to the first modem 320-1 and the second modem 320-2. The audio processor 330 can include one chip with two input and output ports for building two paths, or include a chip with one input and output port and a switching chip for controlling the path. In FIG. 3, the audio processor 330 includes two output ports and one input port. Accordingly, the switch 340 is connected to the input port. In this case, the audio processor 330 receives the voice data from one modem connected by the switch 340. In the dual call setup, the audio processor 330 can output the voice data to both of the first modem 320-1 and the second modem 320-2. When the first modem 320-1 and the second modem 320-2 are implemented using the single united chip, the switch 340 can be implemented in the united chip. Alternatively, the audio processor 330 can include only one output port, and further include a switch connected to the output port. In this case, the audio processor 330 can output the voice data to only the one modem connected by the switch.

The call controller 350 determines whether to set the call over the first network or the second network, and controls the call setup. In general, the determination of the call setup is performed in an application layer according to a user's command. Hence, the call controller 350 can be an Application Processor (AP) operating in the application layer. Alternatively, the call controller 350 can operate in another layer. More particularly, the call controller 350 controls the network switch as discussed below. For the network switch, the call controller 350 can include a VCC controller 352.

During the call setup in the second network, the terminal operates as follows to trigger the switch to the first network. When the second modem 320-2 triggers the switch to the first network during the call setup in the second network, the call controller 350 triggers the first modem 320-1 to set the call to the counterpart of the call of the second network over the first network. Hence, the first modem 320-1 sets the traffic channel with the access network of the first network to communicate with the counterpart. In so doing, the call controller 350 omits the UI generating in the general outgoing call, for example, the recipient number display and the connection sound output. Alternatively, the call controller 350 can directly trigger the network switch using the channel quality information of the networks provided from the first modem 320-1 and the second modem 320-2. Thereafter, when the call setup in the first network is completed, the call controller 350 controls the switch 340 to activate the path between the audio processor 330 and the first modem 320-1. The call controller 350 controls the second modem 320-2 to terminate the call in the second network. In so doing, the call controller 350 can maintain the call in the second network until a predefined time passes after the voice switching.

During the call setup in the second network, the counterpart triggers the switch to the first network as follows. When the paging requests the call setup in the first network during the call setup of the second network, the first modem 320-1 responds to the paging, sets the channel to the access network of the first network, and notifies to the call controller 350. Upon receiving the notification of the channel setup for the call setup in the first network during the call setup of the second network, the call controller 350 compares the counterpart of the call over the second network with the originator of the call over the first network. When the counterparts of the two calls are the same, the call controller 350 recognizes the network switch and switches the call over the second network to the call over the first network. For example, the call controller 350 controls the switch 340 to switch the voice data input path from the second modem 320-2 to the first modem 320-1, and controls the second modem 320-2 to terminate the call of the second network. In so doing, the call controller 350 omits the UI generating in the general call reception, for example, all of the originator number display, the reception sound output, and the user acceptance standby. The call controller 350 can maintain the call in the second network until a predefined time passes after the sound switching.

Figure 4:
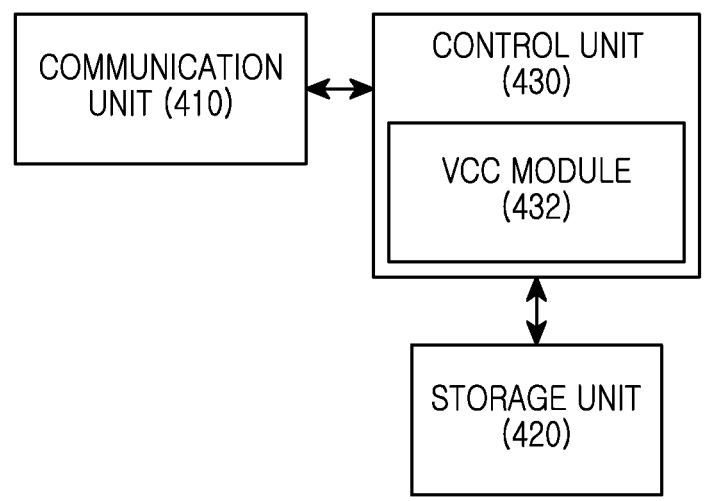
FIG. 4 is a block diagram of a call control station in a wireless communication system according to an exemplary embodiment of the present invention.

FIG. 4 is a block diagram of a call control station in a wireless communication system according to an exemplary embodiment of the present invention.

Referring to FIG. 4, the call control station includes a communication unit 410, a storage unit 420, and a control unit 430.

The communication unit 410 provides the interface for communicating with other entities in the access network and other entities in the core network. For example, the communication unit 410 converts the transmit data to a physical signal, transmits the physical signal, and converts a physical signal received to the receive data.

The storage unit 420 stores data, such as basic program and setup information, for the operations of the call control station. The storage unit 420 provides the stored data according to a request of the control unit 420. For example, the storage unit 420 stores information of the call status of the terminals in the network of the call control station. For example, the storage unit 420 stores the information relating to whether the terminal holds the call set in the current network. Herein, the current network indicates the network of the call control station. Alternatively, the call status information of the terminals can be managed by some other entity than the call control station. In this case, the storage unit 420 may not store the information of the call status of the terminals.

The control unit 430 controls the functions of the call control station. For example, the control unit 430 controls the call originating or received in the terminal over the current network. In other words, the control unit 430 can identify the counterpart of the call originating from the terminal and determine whether to allow the call. The control unit 430 can determine whether to allow the call received at the terminal. More particularly, the control unit 430 includes the VCC module 432 for supporting the network switch based on the dual call. For example, when two terminals, which already set the call in the different network, want to set the dual call over the current network, the VCC module 432 recognizes the network switch and permits the call setup in the current network.

More specifically, when the call setup request generates in the current network, the control unit 430 obtains the information of the call status in the different network with respect to at least one of the originator and the recipient, from the call control station of the different network or the separate entity which manages the information of the call status of the terminals. In so doing, when both of the originator and the recipient are controlled by the call control station, the control unit 430 obtains the call status information of the different network with respect to both of the originator and the recipient. However, when only the originator is under the control of the call control station, the control unit 430 obtains the call status information in the different network of the originator. When only the recipient is under the control of the call control station, the control unit 430 obtains the call status information in the different network of the recipient.

Furthermore, when the first terminal requests the call setup with the second terminal, the control unit 430 obtains the call status information of the second terminal. The control unit 430 determines using the obtained information whether at least one of the originator and the recipient holds the call in the different network. When at least one of the originator and the recipient holds the call in the different network according to the determination, the control unit 430 determines whether the call requested in the current network is the dual call. For example, the control unit 430 determines whether the call in the current network is requested between the two terminals which set the call in the different network. In so doing, when obtaining the originator information, the control unit 430 compares the counterpart of the call of the different network of the originator with the recipient of the call of the current network. When obtaining the recipient information, the control unit 430 compares the counterpart of the call of the different network of the recipient with the recipient of the call of the current network. For example, the control unit 430 can determine whether the counterparts are the same, using various identification information, such as phone numbers. When the dual call is requested in the current network, the control unit 430 allows the call setup in the current network. For example, when at least one of the originator and the recipient holds the call in the different network and the call requested in the current network and the call in the different network have the same counterpart, the control unit 430 recognizes the network switch and permits the call setup in the different network. The control unit 430 directs to page the originator over the access network.

Alternatively, the control unit 430 can further determine whether the recipient is within the coverage area of the current network. For example, when the coverage area of the current network is limited, the control unit 430 determines whether the recipient is within the coverage area of the current network, and performs the following process when the recipient is within the coverage area of the current network.

The control unit 430 can control charging. In the present DCVCC, it is advantageous that the second call is not charged until the first call is disconnected even when the dual call is connected. When the terminal limits the dual call attempt to the DCVCC attempt and the call connection over the first network is requested, the call control station can try the call setup according to the general call connection procedure without determining the status of the counterpart terminal. In this case, it is advantageous that the control unit 430 recognizes the DCVCC for the charging control.

Figure 5:
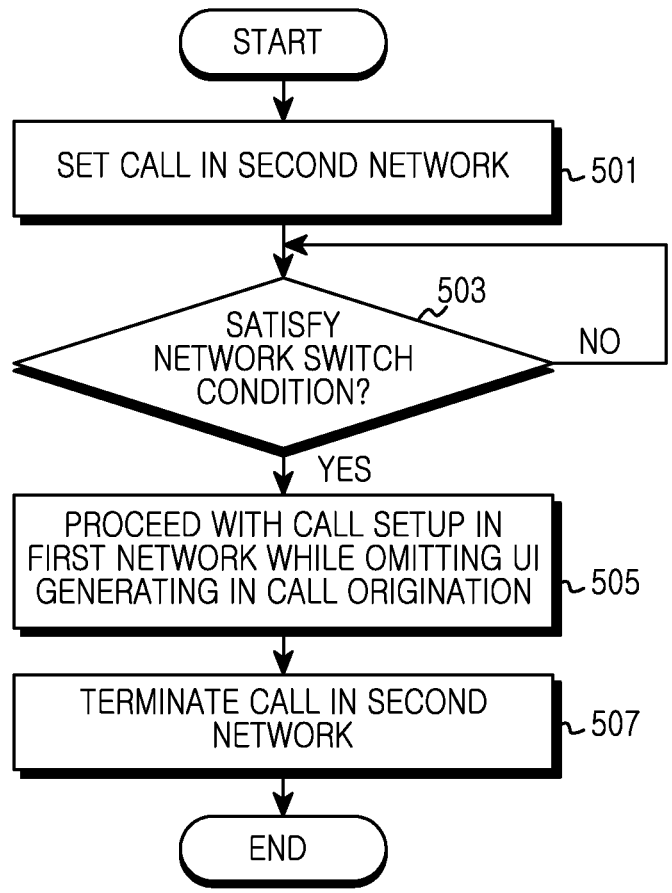
FIG. 5 is a flowchart illustrating operations of a terminal for initiating network switch in a wireless communication system according to an exemplary embodiment of the present invention.

FIG. 5 is a flowchart illustrating operations of a terminal for initiating a network switch in a wireless communication system according to an exemplary embodiment of the present invention. In FIG. 5, the terminal triggers the network switch.

Referring to FIG. 5, the terminal sets the call in the second network in step 501. For example, the terminal includes the modem for accessing the first network and the modem for accessing the second network, and sets the call with the counterpart terminal over the second network. Hence, the audio processing block of the terminal processes the data transmitted and received via the modem for the second network.

While the call is set in the second network, the terminal determines whether the network switch condition is satisfied in step 503. For example, the network switch condition can define that the channel quality of the second network is smaller than the second threshold and the channel status of the first network is greater than the first threshold. For doing so, the terminal continuously monitors the channel status of the first network and the second network.

When the network switch condition is satisfied, the terminal proceeds with the call setup in the first network while omitting the UI generating in the call origination in step 505. For example, the terminal determines to switch the network using the dual call, and sets the call in the first network and the second network with respect to the same counterpart. Yet, the terminal omits the UI generating in the general outgoing call, for example, the recipient number display and the connection sound output. While the dual call is set in the first network and the second network, the terminal can transmit the voice data over both of the first network and the second network.

After completing the call setup in the first network, the terminal terminates the call in the second network in step 507. For example, the terminal sets the dual call with the counterpart over the first network and the second network, and terminates the call in the second network. Yet, before terminating the call in the second network, the terminal controls the voice data input path so that the audio processing block processes the voice data received through the modem for the first network. In so doing, the terminal can hold the call in the second network until the predefined time passes after the voice data path control, and terminate the call in the second network.

Although it is not illustrated in FIG. 5, the call in the second network can be dropped in the process of the call setup of the first network. In this case, the terminal continues the call setup in the first network.

Although it is not illustrated in FIG. 5, as the network switch is attempted at the same time as the counterpart terminal, the call response can be received during the call setup of the first network. In this case, the terminal recognizes that the counterpart terminal attempts the network switch as well, and determines whether to retry the network switch according to a predefined rule. For example, the predefined rule can be the retry of the terminal which originates the existing call. At this time, when the terminal is the originator of the call of the second network, the terminal repeats the steps 505 and 507. In contrast, when the terminal is not the originator of the call of the second network, the terminal waits for the call setup request of the first network from the counterpart terminal.

Figure 6:
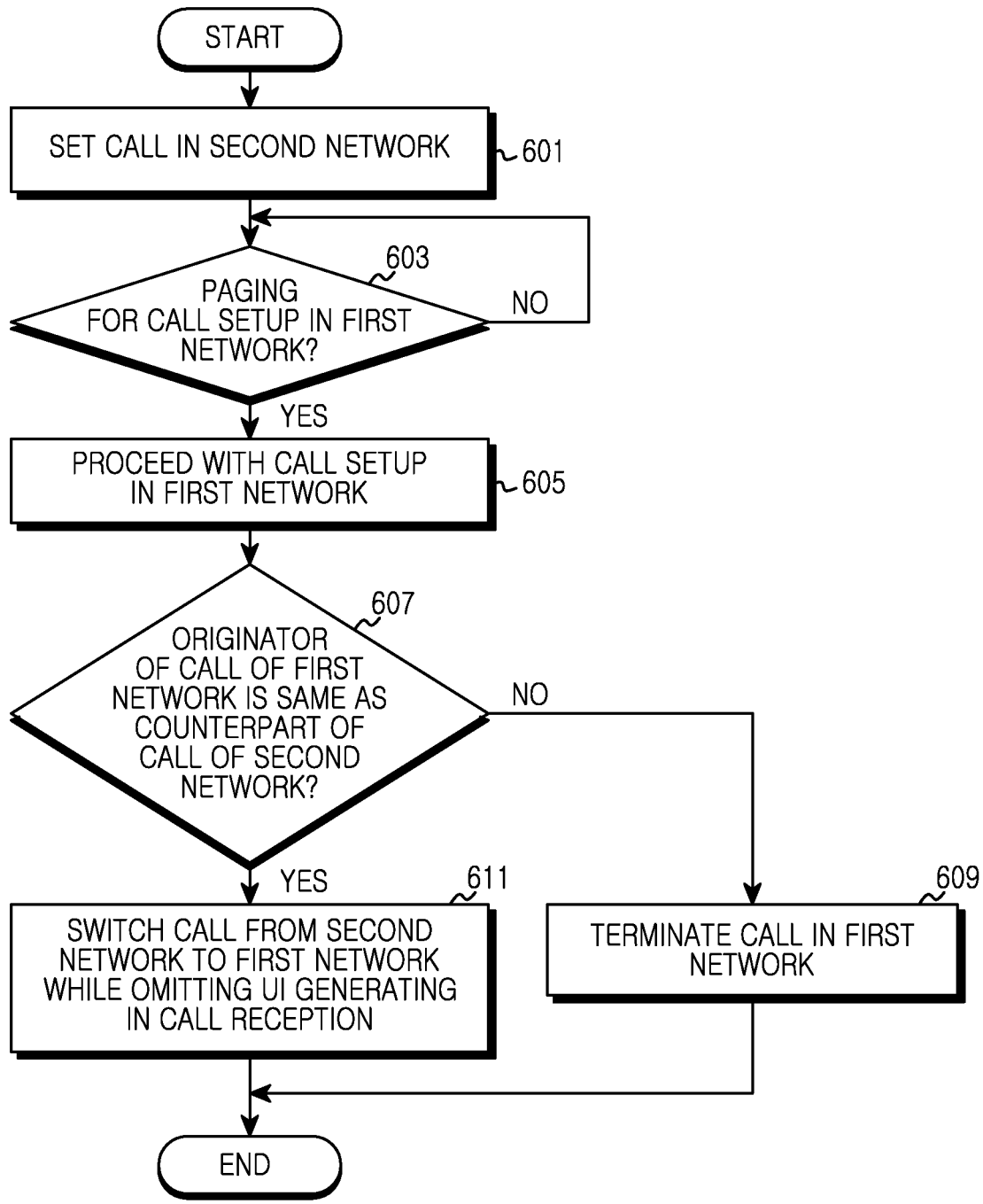
FIG. 6 is a flowchart illustrating operations of a terminal for a network switch in a wireless communication system according to an exemplary embodiment of the present invention.

FIG. 6 is a flowchart illustrating operations of a terminal for a network switch in a wireless communication system according to an exemplary embodiment of the present invention. In FIG. 6, the counterpart of the terminal triggers the network switch.

Referring to FIG. 6, the terminal sets the call in the second network in step 601. For example, the terminal includes the modem for accessing the first network and the modem for accessing the second network, and sets the call with the counterpart terminal over the second network. Hence, the audio processing block of the terminal processes the data transmitted and received via the modem for the second network.

In step 603, the terminal determines whether the call setup request arises in the first network. For example, as the call setup request, the terminal can receive the paging.

When the call setup request arises, the terminal proceeds with the call setup in the first network in step 605. Specifically, upon receiving the paging requesting the call setup in the first network, the terminal responds to the paging and sets the channel with the access network of the first network.

In step 607, the terminal determines whether the originator of the call of the first network is the same as the counterpart of the call of the second network. Namely, the terminal compares the counterpart of the call of the second network with the originator of the call of the first network. For example, the terminal determines whether the dual call is set with the same counterpart, that is, whether it is the network switch by comparing the counterparts of the calls.

When the counterparts of the networks are not the same, the terminal terminates the call of the first network in step 609. For example, when the dual call is set in spite of no network switch, the terminal determines a wrong call setup due to the error of the core network and terminates the call of the first network which is relatively set later. Furthermore, the terminal can notify the error to the access network or the core network.

When the counterparts of the networks are the same, the terminal switches the call from the second network to the first network while omitting the UI generating in the call reception in step 611. For example, the terminal recognizes the network switch, activates the call in the first network, and terminates the call in the second network. Notably, the terminal omits the UI generating in the general call reception, for example, all of the originator number display, the reception sound output, and the user acceptance standby. Before terminating the call of the second network, the terminal controls the voice data path so that the audio processing block processes the voice data received through the modem for the first network. In so doing, the terminal can hold the call in the second network until the predefined time passes after the voice data path control, and terminate the call in the second network. During the dual call set in the first network and the second network, the terminal can transmit the voice data over both of the first network and the second network.

Although it is not illustrated in FIG. 6, the call in the second network can be dropped in the process of the call setup of the first network. In this case, the terminal continues the call setup in the first network.

Figure 7:
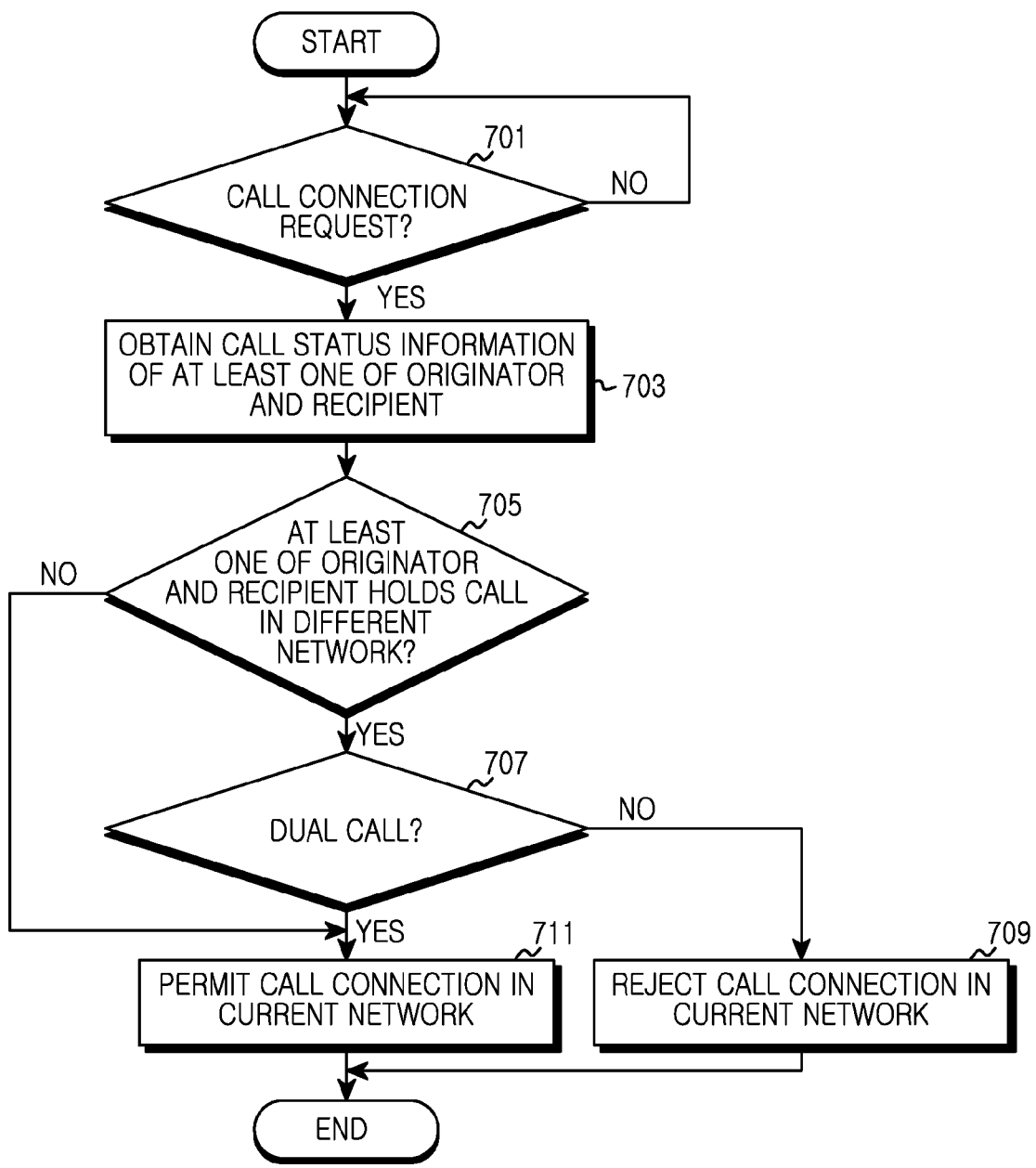
FIG. 7 is a flowchart illustrating operations of a call control station in a wireless communication system according to an exemplary embodiment of the present invention.

FIG. 7 is a flowchart illustrating operations of a call control station in a wireless communication system according to an exemplary embodiment of the present invention. In FIG. 7, the call control station belonging to the first network operates for the network switch from the second network to the first network.

Referring to FIG. 7, the call control station determines whether the call setup request of the first network arises in step 701. Hereafter, to ease the understanding, the originator of the call of the first network is referred to as a first terminal, and a recipient is referred to as a second terminal.

When the call setup request of the first network generates, the call control station obtains the call status information of the different network of at least one of the originator and the recipient in step 703. For example, the call status information of the different network can be obtained from the call control station of the second network or from the separate entity which manages the call status information of the terminals. When both of the originator and the recipient are under the control of the call control station, the call control station obtains the call status information of the different network with respect to both of the originator and the recipient. However, when only the originator is under the control of the call control station, the call control station obtains the call status information of the different network of the originator. When only the recipient is under the control of the call control station, the call control station obtains the call status information of the different network of the recipient.

In step 705, the call control station determines whether at least one of the originator and the recipient holds the call in the different network including the second network. When at least one of the originator and the recipient does not hold the call in the different network including the second network, the call control station goes to step 711. Yet, when obtaining the information of only one of the originator and the recipient in step 703 and the terminal corresponding to the obtained information does not hold the call in the different network, the call control station goes to step 711.

In contrast, when at least one of the originator and the recipient holds the call in the different network, the call control station determines whether the call requested in the first network is the dual call. For example, the call control station determines whether the call requested in the first network is requested between the two terminals which set the call in the second network in step 707. At this time, when obtaining the originator information in step 703, the call control station compares the counterpart of the call of the second network of the originator with the recipient of the call of the first network. When obtaining the recipient information in step 703, the call control station compares the counterpart of the call of the second network of the recipient with the originator of the call of the first network. For example, the call control station can determine whether the counterparts are the same, using various identification information, such as phone numbers.

When the call requested in the first network is not the dual call, the call control station rejects the call setup in the current network in step 709. Namely, when at least one of the originator and the recipient holds the call in the different network but the call requested in the step 701 and the call of the different network have the different counterparts, the call control station rejects the call setup in the current network (e.g., the first network). Hence, the call control station can send at least one of a signal notifying the call setup disapproval and a signal notifying the reason of no connection to the originator.

In contrast, when the call requested in the first network is the dual call, the call control station permits the call setup in the current network in step 711. For example, when at least one of the originator and the recipient holds the call in the different network and the call requested in the step 701 and the call in the different network have the same counterparts, the call control station recognizes the network switch and permits the call setup in the current network (e.g., the first network). The call control station directs to page the originator over the access network.

Alternatively, the call control station can further determine whether the second terminal travels in the coverage area of the current network. For example, when the current network is the network of the limited coverage area, the call control station determines whether the second terminal travels in the coverage area of the current network, and performs the above-mentioned operations when the second terminal is in the coverage area of the current network.

Although it is not depicted in FIG. 7, the dual call setup request can be received from the first terminal and the second terminal at the same time. In this case, the call control station can send the response to both of the first terminal and the second terminal during the call.

As set forth above, the terminal accessible to two or more networks changes the call connection medium through the dual call connection in the wireless communication system. Therefore, the call continuity can be provided effectively without additional interface of the system, connection delay, and data loss.

Exemplary embodiments of the present invention, according to the claims and description in the specification, can be realized in the form of hardware, software or a combination of hardware and software.

Such software may be stored in the form of a volatile or a non-volatile storage device, such as a Read Only Memory (ROM), rewritable or not, or in the form of memory, such as a Random Access Memory (RAM), memory chips, device or integrated circuits or an optically or magnetically readable medium, such as a Compact Disc (CD), a Digital Video Disc (DVD), a magnetic disk, and the like. It will be appreciated that the storage devices and storage media are embodiments of machine-readable storage that are suitable for storing a program or programs comprising instructions that, when executed, implement exemplary embodiments of the present invention. Exemplary embodiments provide a program comprising code for implementing an apparatus or a method of the present invention and a machine-readable storage storing such a program. Furthermore, such programs may be conveyed electronically via any medium, such as a communication signal, carried over a wired or a wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a wireless communication system, the method comprising:
   setting a first call with a counterpart terminal in a first network;
   setting a second call with the counterpart terminal in a second network during a maintenance of the first call in the first network; and
   terminating the first call after the setting of the second call is completed in the second network,
   wherein, upon the terminal receiving an input of a voice signal, the voice signal is encoded, by an encoding scheme for the first network, to generate first voice data and is encoded, by an encoding scheme for the second network, to generate second voice data, and
   wherein both of the first voice data and the second voice data are transmitted through each of the first network and the second network.

2. The method of claim 1,
   wherein one of the first network or the second network provides a circuit switched (CS) call, and
   wherein the other of the first network or the second network provides a voice over internet protocol (VoIP) call.

3. The method of claim 1, wherein the first voice data and the second voice data are transmitted over the first network and the second network during a time period when the first call and the second call are maintained.

4. The method of claim 1, further comprising:
before terminating the first call in the first network, switching a voice data input path of an audio processing block so as to process voice data received over the second network.

5. The method of claim 4, wherein the first call is terminated after the voice data input path is switched and a predefined time passes.

6. The method of claim 1, wherein the setting of the second call comprises:
if at least one predefined condition is satisfied, requesting call setup to the second network.

7. The method of claim 6, wherein the at least one predefined condition comprises:
whether a channel quality of the first network is smaller than a first threshold, or
whether a channel quality of the second network is greater than a second threshold.

8. The method of claim 6, wherein the setting of the second call comprises:
setting the second call and bypassing a user interface (UI) generation of at least one of a recipient number display or a connection sound output.

9. The method of claim 1, wherein the setting of the second call comprises:
if a call setup is requested from the second network, building a channel to an access network of the second network.

10. The method of claim 9, further comprising:
before terminating the first call, determining whether an originator of the second call is the same as a counterpart of the first call.

11. The method of claim 9, wherein the setting of the second call comprises:
setting the second call and bypassing a user interface (UI) generation of at least one of an originator number display, a reception sound output, or a user acceptance standby.

12. A method for operating an entity for controlling a call in a wireless communication system, the method comprising:
receiving, from at least one of a terminal or a counterpart terminal, a request for setting a first call between the terminal or the counterpart terminal in a first network,
wherein the terminal and the counterpart terminal are both engaged in a second call in a second network,
wherein the setting of the first call is allowed by the entity responsive to the request,
wherein, upon the terminal or the counterpart terminal receiving an input of a voice signal, the voice signal is encoded by an encoding scheme for the first network, to generate first voice data and is encoded by an encoding scheme for the second network to generate second voice data, and
wherein both of the first voice data and the second voice data are transmitted through each of the first network and the second network.

13. The method of claim 12, further comprising:
if an originator of the first call holds the second call, determining whether the counterpart of the second call is the same as the recipient of the first call.

14. The method of claim 12, further comprising:
if a recipient of the first call holds the second call, determining whether the counterpart of the second call of is the same as the originator of the first call.

* * * * *